(12) United States Patent
Fan

(10) Patent No.: US 12,719,976 B2
(45) Date of Patent: Aug. 25, 2026

(54) CLAMPING DEVICE WITH ADJUSTABLE CLAMPING THICKNESS

(71) Applicant: Eagle Fan, Chu-Pei City (TW)

(72) Inventor: Eagle Fan, Chu-Pei City (TW)

( * ) Notice: Subject to any disclaimer, the term of this patent is extended or adjusted under 35 U.S.C. 154(b) by 300 days.

(21) Appl. No.: 18/230,630

(22) Filed: Aug. 5, 2023

(65) Prior Publication Data

US 2024/0388650 A1 Nov. 21, 2024

(30) Foreign Application Priority Data

May 18, 2023 (CN) ......................... 202321198076.0

(51) Int. Cl.
*H04M 1/04* (2006.01)

(52) U.S. Cl.
CPC .................................... *H04M 1/04* (2013.01)

(58) Field of Classification Search
CPC ...................................................... H04M 1/04
See application file for complete search history.

(56) References Cited

U.S. PATENT DOCUMENTS 5,305,381 A * 4/1994 Wang .................. B60R 11/0241 379/426
5,457,745 A * 10/1995 Wang .................. B60R 11/0241 379/426
5,649,741 A * 7/1997 Beggs .................... A47C 7/402 297/411.36
6,155,643 A * 12/2000 Gorgi ..................... A47C 7/402 297/353
6,320,962 B1 * 11/2001 Eisenbraun ......... B60R 11/0241 379/454
9,668,582 B2 * 6/2017 Cybulski ................ A47C 7/402
2004/0095008 A1 * 5/2004 Marini ..................... A47C 1/03 297/411.35
2006/0239444 A1 * 10/2006 Piekarz ................... H04M 1/04 379/420.01
2021/0059437 A1 * 3/2021 Chapuis ................. F16M 11/04
2022/0390062 A1 * 12/2022 Lien ....................... F16M 13/02

* cited by examiner

*Primary Examiner* — David Tung
(74) *Attorney, Agent, or Firm* — John D. Tran; Rhema Law Group

(57) ABSTRACT

A clamping device and method of manufacture can include providing a base, having a placement surface; mounting a first clamping arm; mounting a second clamping arm the first clamping arm or the second clamping arm movable toward and away from the base; affixing a first carrier at a first clamping arm end of the first clamping arm, the first carrier extended with respect to the placement surface; affixing a second carrier at a second clamping arm end of the second clamping arm; arranging a first clamping part on the first carrier, the first clamping part moveable along the first carrier to adjust a height between the first clamping part and the placement surface; and arranging a second clamping part on the second carrier, the first clamping part and the second clamping part for clamping two sides of the electronic product.

20 Claims, 5 Drawing Sheets

CLAMPING DEVICE WITH ADJUSTABLE CLAMPING THICKNESS

BACKGROUND

1. Field of the Invention

The present invention relates generally to a portable electronic product clamping device, and more particularly, to a clamping device with adjustable clamping thickness.

2. The Prior Arts

A clamping device is used for clamping various electronic products, such as mobile phones, driving recorders, video players, and so on. At present, various clamping devices generally use two clamping arms to clamp on both sides of the electronic product to achieve clamping and fixing. However, with the difference in thickness of the electronic product, the clamping position will also change, affecting the effect of clamping and fixing. In order to obtain a good clamping fixing effect on a variety of electronic products with different thicknesses, the clamping device is proposed to address the issue.

SUMMARY

A primary objective of the present disclosure is to provide a clamping device that can adjust the clamping thickness, mainly to design at least two clamping parts that are responsible for clamping electronic products in a way that can move up and down, so that the clamping device can be used with more electronic products of different sizes.

In order to achieve the aforementioned objective, the present disclosure has adopted the following technical solutions:

The present disclosure provides a clamping device with adjustable clamping thickness, including: a base, two clamping arms, and at least two clamping parts, the base having a placement surface for placing electronic products: the two clamping arms be disposed on opposite sides of the base, at least one of the clamping arms movable to approach or move away from the other clamping arm, each of the clamping arms having at least one carrier at the end away from the base, the carrier protruding from the placement surface: the at least two clamping parts being respectively arranged on the carrier of each clamping arm, and the clamping part able to move along the carrier to adjust the height between the placement surface and the two clamping parts: the two clamping parts being responsible for clamping the two sides of the electronic product.

In a preferred embodiment, the carrier is erected at one end of the clamp arm, the carrier has a guide groove, a movable elastic top part is arranged in the guide groove, and a protruding strip is arranged in the clamping part, the side wall of the protruding strip has a plurality of positioning arc grooves, the clamping part is arranged in the guide groove through the protruding strip, so that the clamping part can move up and down along the carrier, and when the elastic top part is latched and positioned in one of the arc grooves, the height of the clamping part on the carrier is temporarily fixed.

In a preferred embodiment, the guide groove is arranged in a direction perpendicular to the placement surface.

In a preferred embodiment, the elastic top part is an arc-shaped metal shrapnel and has a protrusion in the middle, and the carrier has an accommodating groove on the same wall where the guide groove is located, the accommodating groove has an opening and the opening communicates with the guide groove, and the elastic top part is restricted in the accommodating groove, the protruding part is located in the guide groove through the opening: when the external force makes the protruding strip moving and pushing the protruding part in the guide groove, the protruding part can withdraw from the guide groove; and when the external force disappears, the protruding part is pushed against the positioning arc groove, and the height of the clamping part at the carrier is fixed.

In a preferred embodiment, the clamping part is provided with a cushion on the side wall facing the base, and the cushion is in an inverted L-shape.

In a preferred embodiment, the base also includes a stopper, and the stopper has at least one stopping element protruding from the placement surface.

In a preferred embodiment, the stopper can move to approach or away from the base.

In a preferred embodiment, the clamping arm is disposed with a plurality of erected carriers, and the plurality of clamping parts is arranged on the corresponding plurality of carriers.

Compared with the prior art, the clamping device of the present disclosure is also provided with clamping parts that can move up and down at the two movable clamping arms on both sides of the base, and the two clamping parts, after adjusting the height, are used to clamp on both sides of electronic products, so as to achieve good clamping effect on electronic products of different thicknesses.

BRIEF DESCRIPTION OF THE DRAWINGS

The clamping device will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the clamping device, and are incorporated in and constitute a part of this specification. The drawings illustrate embodiments of the clamping device and, together with the description, serve to explain the principles of the clamping device.

The technical solutions of the clamping device will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the clamping device. The terminology used herein is for the purpose of describing particular embodiments only and is not intended to limit the clamping device. As used herein, the term "and/or" includes any and all combinations of one or more of the associated listed items.

Figure 1:
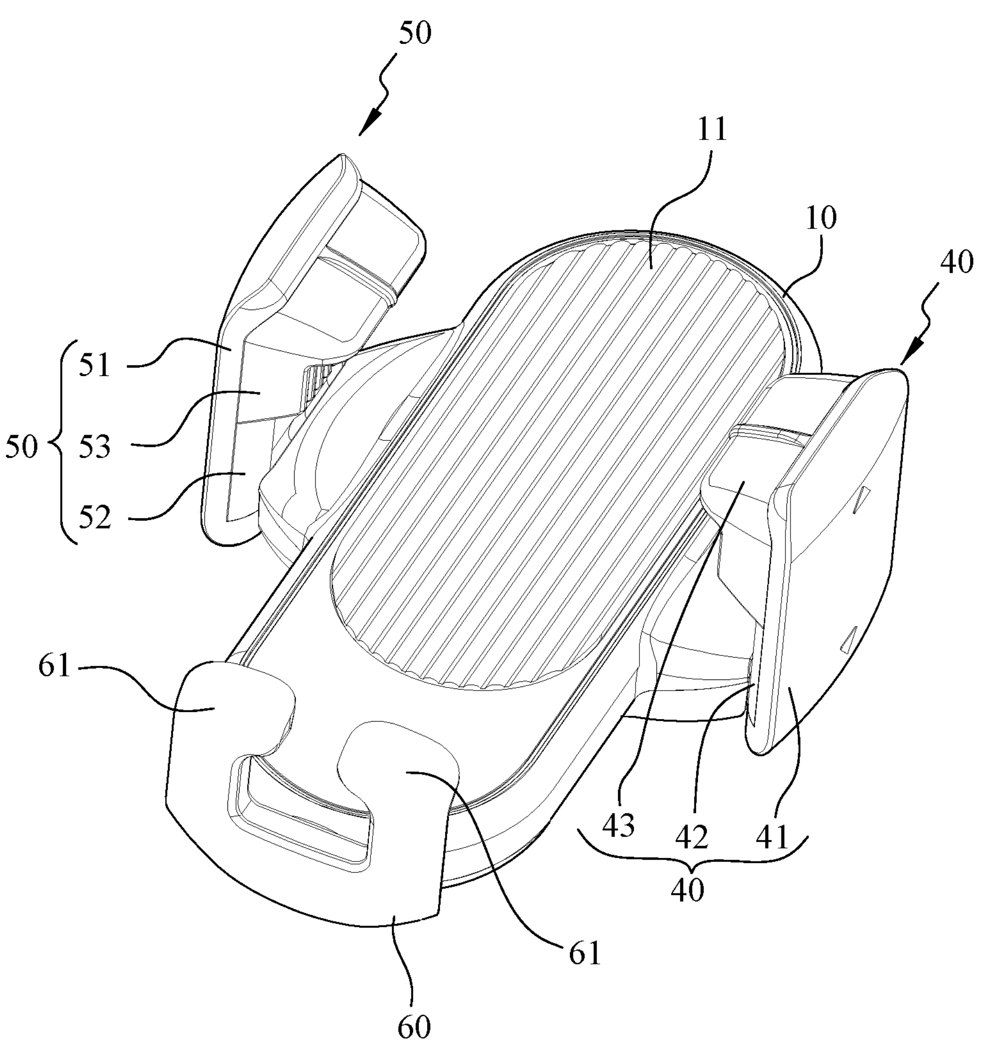
FIG. 1 is a schematic view of the clamping device.
Figure 2:
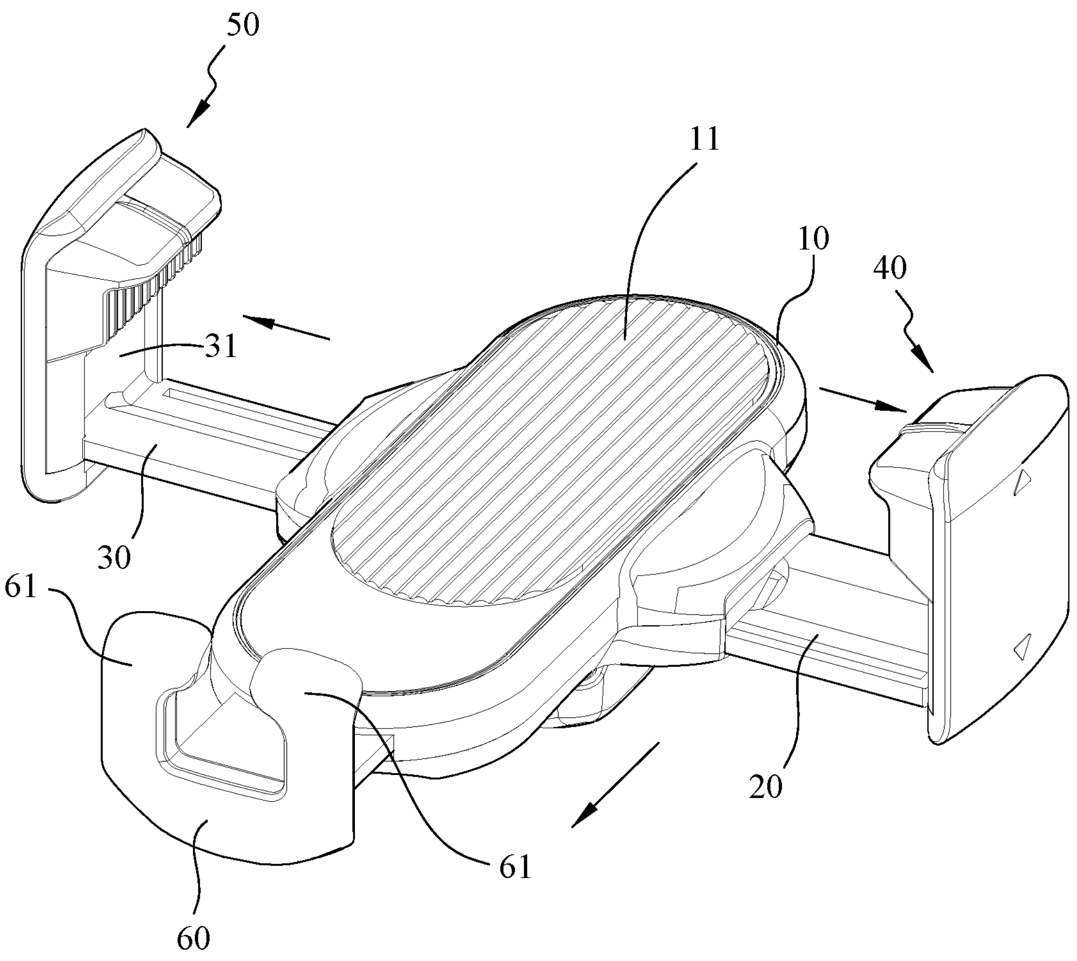
FIG. 2 is a perspective view of the clamp arm of the clamping device in an opening state.

As shown in FIG. 1 and FIG. 2, the clamping device with adjustable clamping thickness in the clamping device includes: a base 10, two clamping arms 20, 30 and at least two clamping parts 40, 50. The base 10 has a placement surface 11 for placing electronic products: the two clamping arms 20, 30 are installed on the opposite sides of the base 10, at least one clamping arm 20 can move to approach or move away from the other clamping arms 30. Each clamping arm 20, 30 has at least one carrier 21, 31 at one end away from the base 10, and the carrier 21, 31 protrudes and is extended with respect to the placement surface 11. The two clamping parts 40, 50 are respectively arranged at the carrier 21, 31 of the corresponding clamping arm 20, 30. The clamping part 40, 50 can move along the carrier 21, 31 to adjust the relative height with the placement surface 11. The two clamping parts 40 and 50 are responsible for clamping the two sides of the electronic product, so that electronic products of different thicknesses can be well clamped by using the clamping device of the clamping device.

The clamping device in the present embodiment is of an electric type, and the base 10 is provided with a motor and a gear to drive the clamp arm 20 and the clamp arm 30 to move synchronously toward or away from each other. However, the clamping device is not limited therein, and the clamping device can also be manually operated, that is, a spring is provided inside the base 10 to provide power for the clamping arm 20 and the clamping arm 30 to move. In addition, the base 10 also includes a stopper 60, the stopper 60 has at least one stopping element 61 that protrudes from the placement surface 11. In the present embodiment, the stopper 60 can also move toward or away from the base 10, and the position of the stopping element 61 is perpendicular to the moving direction of the clamp arms 20, 30. The function of the stopper 60 is to prevent the electronic products placed on the placement surface 11 from sliding down, and since the above structures are in line with the conventional ones, no further description will be provided.

Figure 3:
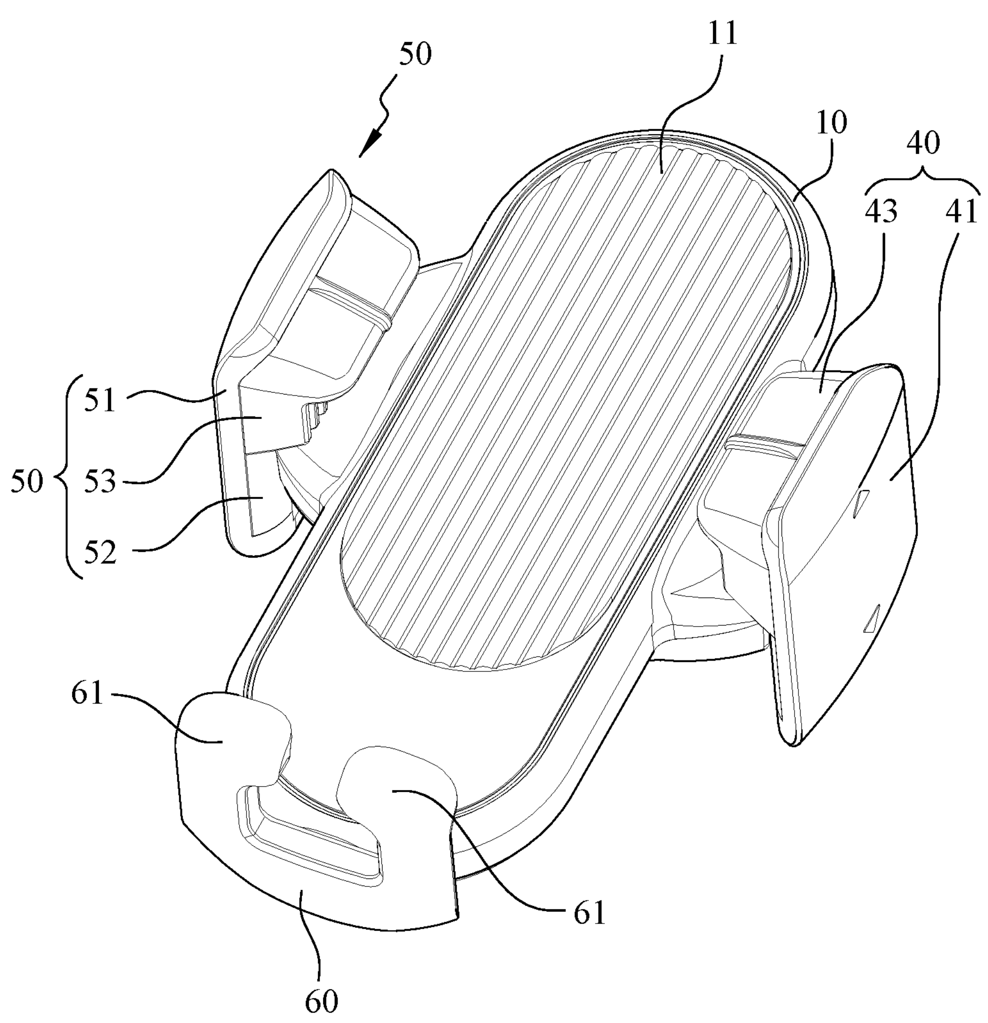
FIG. 3 is a perspective view after lowering the height of the clamping part of the clamping device.

The clamping device is a clamping device with adjustable clamping thickness. It is mainly designed to allow the clamping parts 40, 50 to move up and down, and then adjust the height with the placement surface 11, as shown in FIG. 1. As shown, the position of the clamping part 40 and the clamping part 50 is the highest, and can hold the thickest electronic product. As shown in FIG. 3, the clamping part 40 and the clamping part 50 are adjusted to the lowest position, which is suitable for thinner electronic products, so that the clamping device can be applied to more electronic products of different sizes.

Figure 4:
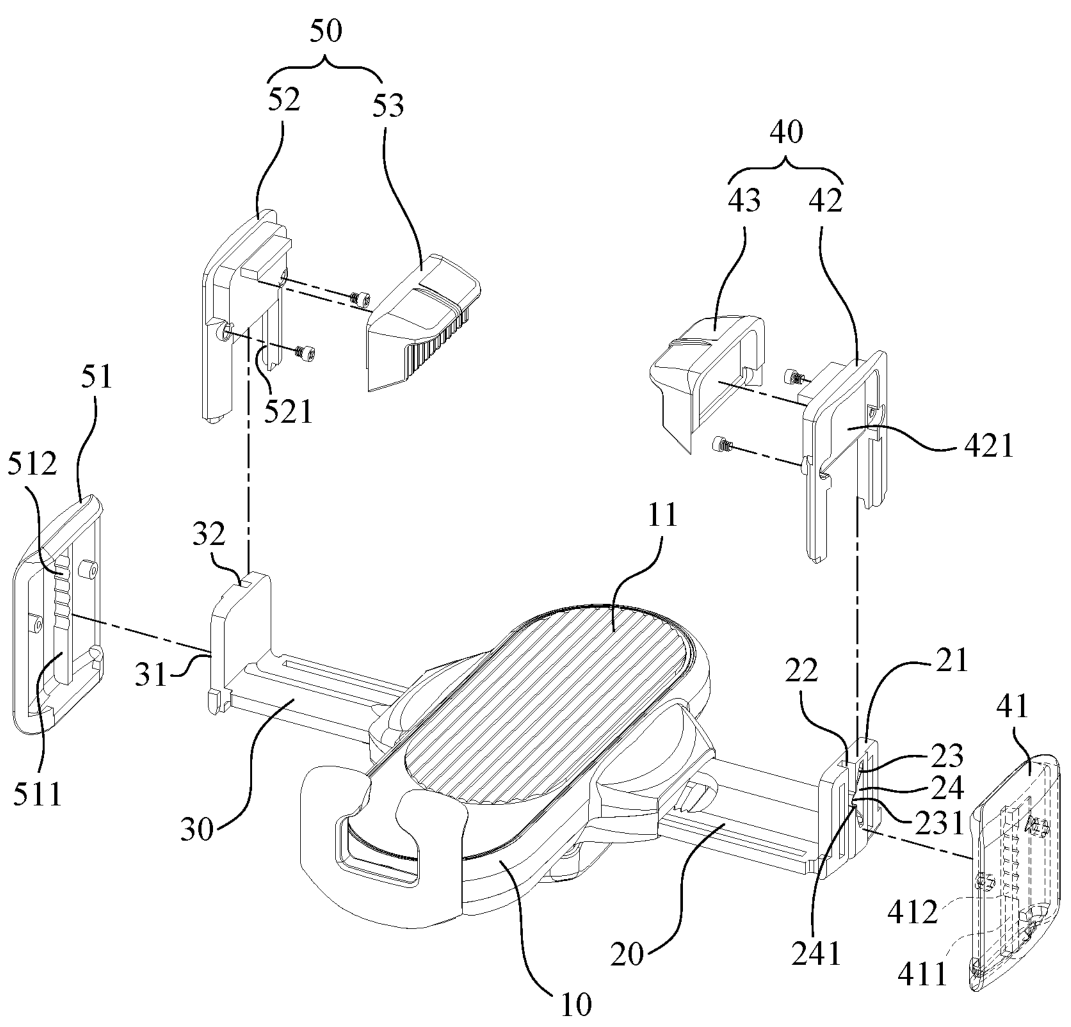
FIG. 4 is an exploded view of the clamping device.

The structure of the clamping device is described in detail. FIG. 4 shows is an exploded view of the clamping device. Since the clamping part 40 and the clamping part 50 are similar in structure, the description will be focus on the clamping part 40 disposed on the clamping arm 20. Similarly, the clamping arm 30 and the clamping part 50 also have the same structure as the clamping part 40 and clamping arm 20.

Figure 5:
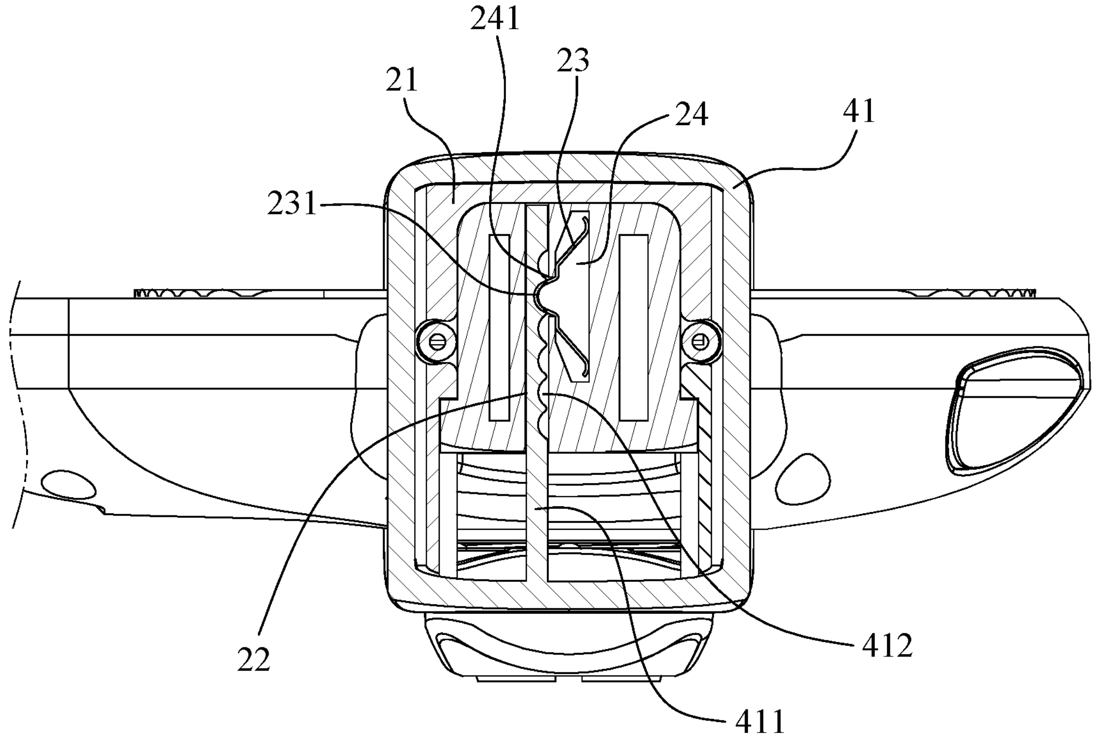
FIG. 5 is a schematic longitudinal cross-sectional view of the clamping part of the clamping device.

The clamping arm 20 is an L-shaped body in cross-section, and partially extends into the base 10. As described, the clamping arm 20 is driven by the motor and the gear in the base 10. The clamping arm 20 has the carrier 21 erected at the end away from the base 10, the carrier 21 protrudes from the placement surface 11, and the carrier 21 is responsible for installing the clamping part 40 therein. Therefore, the clamping part 40 can move along the carrier 21 in a direction perpendicular to the placement surface 11. Refer to FIG. 5, wherein the carrier 21 has a guide groove 22 facing away from the wall of the base 10, and the guide groove 22 is longitudinally through. There is also a movable elastic top part 23 located in the guide groove 22, the elastic top part 23 has to withdraw from the guide groove 22 when the external force is received, and when the external force disappears, the elastic force makes the elastic top part 23 returning to move inside the guide groove 22. This structure can be constructed in various ways, and the present embodiment only provides one for illustration, but it is not meant to be restrictive. In the present embodiment, the elastic top part 23 is an arc-shaped metal elastic piece with a protruding portion 231 in the middle. The elastic top part 23 is shown with a uniform thickness or a substantially uniform thickness and positioned within the positioning arc groove 412 and shown with the arc-shaped elastic piece being in direct contact with the positioning arc groove 412 of the protruding strip 411 of the first clamping part 40 within the housing element 41. The carrier 21 has an accommodating groove 24 on the same wall where the guide groove 22 is located. The accommodating groove 24 and the guide groove 22 have an opening 241 and the opening 241 communicates with the guide groove 22. The elastic top part 23 is limited in the accommodating groove 24, the protruding portion 231 extends into the guide groove 22 through the opening 241. When an external force pushes the protruding portion 231, the protruding portion 231 has to withdraw from the guide groove 22, and reset automatically when the external force disappears.

In the present embodiment, the clamping part 40 includes a housing element 41, an intermediary element 42 and a cushion 43. The side wall of the housing element 41 facing the base 10 has a protruding strip 411, and the sidewall of the protrusion 411 has a plurality of positioning arc grooves 412. The elastic top part 23 does not extend past an edge of the sidewall defining a width of the plurality of positioning arc grooves 412; more particularly, the elastic top part 23 does not extend past a projection of an edge of the sidewall defining a width of the plurality of positioning arc grooves 412, the projection perpendicular to both the width and a direction of travel of the sidewall. The side wall of the intermediary element 42 facing the housing element 41 has a chamber 421. The longitudinal dimension of the chamber 421 is larger than that of the carrier 21, and the transverse width corresponds to each other. After the housing element 41 is locked with the intermediary element 42, the carrier 21 will be confined in the chamber 421 to ensure that the clamping part 40 can move up and down without detaching from the carrier 21. As shown in FIG. 5, in addition, after being locked, when pushed by an external force, the protruding strip 411 can slide up and down because it is located in the guide groove 22. When pressing against one of the positioning arc grooves 412, the height of the clamping part 40 on the carrier 21 can be fixed.

The cushion 43 is located in the direction of the clamping part 40 towards the base 10. More specifically, the cushion 43 is fixed on the side wall of the intermediate element 42 towards the base 10. The cushion 43 is a cover pad having inverted L-shaped body in vertical direction. The cushion 43 is in contact with the electronic product during clamping to increase friction and prevent the surface of the electronic product from being scratched. In addition, the inverted L-shaped body also helps to prevent the electronic product from falling after clamping. The cushion 43 is made of sponge or soft colloid (such as silicone), and when glued to the side wall of the intermediary element 42, the screw holes at the intermediary element 42 are covered, so that the clamping part 40 has a more compact and pleasing appearance.

Moreover, the clamping arm 30 and the clamping part 50 are also constructed with the same structure. For example, the end of the clamp arm 30 away from the base 10 also has the carrier 31, the carrier 31 also has a guide groove 32, and a movable elastic top part is arranged in the guide groove 32. The clamping part 50 has a protruding strip 511 inside, and the protruding strip 511 is disposed with a plurality of positioning arc grooves 512 on the side wall. The clamping part 50 is arranged in the guide groove 32 via the protruding strip 511, so that the clamping part 50 can move up and down along the carrier 31. When the elastic top part is pressed against one of the positioning arc grooves 512, the height of the clamping part 50 on the carrier 31 is temporarily fixed.

Moreover, the clamping part 50 also includes a housing element 51, an intermediary element 52 and a cushion 53. The side wall of the housing element 51 facing the base 10 has a protruding strip 511. The side wall of the intermediary element 52 facing the housing element 51 has a chamber. After the housing element 51 is locked with the intermediary element 52, the carrier 31 will also be confined in the chamber to ensure that the clamping part 50 can move up and down without detaching from the carrier 31. The cushion 53 is also disposed on the clamping part 50 and faces the base 10.

In the above-mentioned embodiment of the present creation, although each clamping arm is only provided with one clamping part, it is not limited therein. A plurality of clamping parts can also be used as long as a plurality of protruding carriers is erected. In addition, one clamping arm may be provided with one clamping part, and the other clamping arm may be provided with two clamping parts, so as to meet the needs of different products.

In summary, the clamping device is provided with movable clamping arms 20, 30 on both sides of the base 10, so as to achieve the objective of clamping or opening. Moreover, the ends of the clamping arms 20, 30 away from the base 10 are provided the movable clamping part 40 and clamping part 50 respectively to adjust the height, and the clamping part 40 and the clamping part 50 are to clamp on the two sides of the electronic product of different thicknesses to achieve a good clamping effect.

Although the clamping device has been described with reference to the preferred embodiments thereof, it is apparent to those skilled in the art that a variety of modifications and changes may be made without departing from the scope of the clamping device which is intended to be defined by the appended claims.

What is claimed is:

1. A clamping device comprising:

a base, having a placement surface for placing an electronic product;

a first clamping arm disposed on a first side of the base;

a second clamping arm disposed on a second side of the base, the first clamping arm or the second clamping arm movable toward and away from the base, and the first side of the base opposite the second side of the base;

a first carrier at a first clamping arm end of the first clamping arm, the first carrier extended with respect to the placement surface;

a second carrier at a second clamping arm end of the second clamping arm, the second carrier extended with respect to the placement surface;

a first clamping part arranged on the first carrier, the first clamping part moveable along the first carrier to adjust a height between the first clamping part and the placement surface, the first clamping part comprises a protruding strip having a positioning arc groove on a sidewall of the protruding strip;

a second clamping part arranged on the second carrier, the first clamping part and the second clamping part for clamping two sides of the electronic product; and an elastic top part within the positioning arc groove, the elastic top part fixes a position of the first clamping part based on the elastic top part being in direct contact with the first clamping part, and the elastic top part does not extend past an edge of the sidewall defining a width of the positioning arc groove.

2. The system of claim 1 wherein:

the first clamping part or the second clamping part comprises an other side wall facing the base; and further comprising:

a cushion on the other side wall facing the base, and the cushion is in an inverted L-shape.

3. The system of claim 1 wherein: the base includes a stopper, the stopper comprises a stopping element protruding from the placement surface.

4. The system of claim 3 wherein: the stopper is moveable toward and away from the base.

5. The system of claim 1 further comprising a motor or a spring configured to move the first clamping arm or the second clamping arm toward the base.

6. A clamping device comprising:

a base, having a placement surface for placing an electronic product;

a first clamping arm disposed on a first side of the base;

a second clamping arm disposed on a second side of the base, the first clamping arm or the second clamping arm movable toward and away from the base, and the first side of the base opposite the second side of the base;

a first carrier at a first clamping arm end of the first clamping arm, the first carrier extended with respect to the placement surface, the first carrier comprises a guide groove;

a second carrier at a second clamping arm end of the second clamping arm, the second carrier extended with respect to the placement surface;

a first clamping part arranged on the first carrier, the first clamping part moveable along the first carrier to adjust a first height between the first clamping part and the placement surface, the first clamping part comprises a protruding strip having a positioning arc groove on a sidewall of the protruding strip, the protruding strip being located in the guide groove, and the first clamping part moveable with respect to the first carrier;

an elastic top part arranged in the guide groove, the elastic top part fixes a position of the first clamping part based on the elastic top part being within the positioning arc groove and based on the elastic top part being in direct contact with the positioning arc groove, and the elastic top part does not extend past an edge of the sidewall defining a width of the positioning arc groove; and a second clamping part arranged on the second carrier, the second clamping part moveable along the second carrier to adjust a second height between the second clamping part and the placement surface, the first clamping part and the second clamping part for clamping two sides of the electronic product.

7. The system of claim 6 wherein: the guide groove is arranged in a direction perpendicular to the placement surface.

8. The system of claim 6 wherein:

the guide groove has an opening; and the elastic top part has a protruding portion, the protruding portion extends into the guide groove through the opening, the protruding portion withdrawn from the guide groove based on an external force being applied to the protruding strip, and the protruding portion pushed against the positioning arc groove to fix the first height based on the external force being removed.

9. The system of claim 6 wherein: the elastic top part is an arc-shaped elastic top part with a uniform thickness and having a protrusion in a middle of the arc-shaped elastic top part.

10. The system of claim 6 wherein: the first clamping part comprises a housing element and an intermediary element, the intermediary element comprises a chamber facing the housing element, the first carrier being confined in the chamber, the first clamping part moveable without detaching from the first carrier.

11. A method of manufacturing a clamping device comprising:

providing a base, having a placement surface for placing an electronic product;

mounting a first clamping arm on a first side of the base;

mounting a second clamping arm on a second side of the base, the first clamping arm or the second clamping arm movable toward and away from the base, and the first side of the base opposite the second side of the base;

affixing a first carrier at a first clamping arm end of the first clamping arm, the first carrier extended with respect to the placement surface;

affixing a second carrier at a second clamping arm end of the second clamping arm, the second carrier extended with respect to the placement surface;

arranging a first clamping part on the first carrier, the first clamping part moveable along the first carrier to adjust a height between the first clamping part and the placement surface, the first clamping part comprises a protruding strip having a positioning arc groove on a sidewall of the protruding strip;

arranging a second clamping part on the second carrier, the first clamping part and the second clamping part for clamping two sides of the electronic product; and arranging an elastic top part within the positioning arc groove, the elastic top part fixes a position of the first clamping part based on the elastic top part being in direct contact with the first clamping part, and the elastic top part does not extend past an edge of the sidewall defining a width of the positioning arc groove.

12. The method of claim 11 wherein:

arranging the first clamping part or the second clamping part includes arranging the first clamping part or the second clamping part having an other side wall facing the base; and further comprising:

affixing a cushion on the other side wall, and the cushion is in an inverted L-shape.

13. The method of claim 11 further comprising: mounting a stopper to the base, the stopper comprises a stopping element protruding from the placement surface.

14. The method of claim 13 wherein: mounting the stopper includes mounting the stopper moveable toward and away from the base.

15. The method of claim 11 further comprising mounting a motor or a spring configured to move the first clamping arm or the second clamping arm toward the base.

16. The method of claim 11 wherein:

affixing the first carrier includes affixing the first carrier comprising a guide groove; and arranging the first clamping part includes arranging the first clamping part with the protruding strip being located in the guide groove, and the first clamping part moveable with respect to the first carrier.

17. The method of claim 16 wherein: affixing the first carrier includes affixing the first carrier having the guide groove arranged in a direction perpendicular to the placement surface.

18. The method of claim 16 wherein:

affixing the first carrier includes affixing the first carrier with the guide groove having an opening; and arranging the first clamping part includes arranging the first clamping part with the elastic top part having a protruding portion, the protruding portion extends into the guide groove through the opening, the protruding portion withdrawn from the guide groove based on an external force being applied to the protruding strip, and the protruding portion pushed against the positioning arc groove to fix the height based on the external force being removed.

19. The method of claim 16 wherein: arranging the elastic top part includes arranging the elastic top part as an arc-shaped elastic top part with a uniform thickness and having a protrusion in a middle of the arc-shaped elastic top part.

20. The method of claim 16 wherein: arranging the first clamping part includes arranging the first clamping part comprising a housing element and an intermediary element, the intermediary element comprises a chamber facing the housing element, the first carrier being confined in the chamber, the first clamping part moveable without detaching from the first carrier.

* * * * *